US008380560B2

(12) United States Patent
Barr

(10) Patent No.: US 8,380,560 B2
(45) Date of Patent: Feb. 19, 2013

(54) SATISFACTION METRICS AND METHODS OF IMPLEMENTATION

(76) Inventor: Tony Barr, Gainesville, FL (US)

( * ) Notice: Subject to any disclaimer, the term of this patent is extended or adjusted under 35 U.S.C. 154(b) by 615 days.

(21) Appl. No.: 11/353,932

(22) Filed: Feb. 14, 2006

(65) Prior Publication Data

US 2007/0192163 A1 Aug. 16, 2007

(51) Int. Cl.
*G06Q 10/00* (2006.01)
(52) U.S. Cl. ..................................... 705/7.38
(58) Field of Classification Search ................. 705/7.38
See application file for complete search history.

(56) References Cited

U.S. PATENT DOCUMENTS

| | | | |
|---|---|---|---|
| 5,023,435 A | 6/1991 | Deniger | |
| 5,551,880 A | 9/1996 | Bonnstetter et al. | |
| 5,566,291 A | 10/1996 | Boulton et al. | |
| 5,615,134 A | 3/1997 | Newsham et al. | |
| 5,926,794 A | 7/1999 | Fethe | |
| 5,963,910 A * | 10/1999 | Ulwick | 705/7 |
| 6,154,753 A | 11/2000 | McFarland | |
| 6,189,029 B1 | 2/2001 | Fuerst | |
| 6,556,974 B1 * | 4/2003 | D'Alessandro | 705/10 |
| 2002/0019764 A1 * | 2/2002 | Mascarenhas | 705/10 |
| 2002/0029162 A1 * | 3/2002 | Mascarenhas | 705/10 |
| 2002/0111838 A1 | 8/2002 | Welbourne | |
| 2002/0112011 A1 | 8/2002 | Washington | |
| 2002/0184043 A1 | 12/2002 | Lavorgna, Jr. et al. | |
| 2002/0184085 A1 | 12/2002 | Lindia et al. | |
| 2003/0004778 A1 | 1/2003 | Gareau et al. | |
| 2003/0018487 A1 | 1/2003 | Young et al. | |
| 2003/0061141 A1 | 3/2003 | D'Alessandro | |
| 2003/0069822 A1 | 4/2003 | Ito et al. | |
| 2003/0078804 A1 | 4/2003 | Morrel-Samuels | |
| 2003/0115209 A1 | 6/2003 | Murray | |
| 2004/0230989 A1 * | 11/2004 | Macey et al. | 725/24 |
| 2004/0267794 A1 * | 12/2004 | Might | 707/100 |
| 2005/0130110 A1 * | 6/2005 | Gosling | 434/322 |

OTHER PUBLICATIONS

Training Technologies SurveyTracker software (http://web.archive.org/web/20041223173129/www.surveytracker.com/) 2004.*
Dhiman et al, Graphical User Interface Evaluation, (http://web.archive.org/web/19970709014848/http://wwwd0.fnal.gov/~lueking/gui/recommend/recommend.html) 1997.*
UltraFeedback software (http://web.archive.org/web/20050130235733/http://ultrafeedback.com) 1999-2005.*
Online Survey Software Confirmit http://web.archive.org/web/20050212030204/http://www.confirmit.com (2004-2005).*
Web Survey Software from Perseus http://web.archive.org/web/20050213093451/www.perseus.com (1993-2005).*
Wisco Survey Power http://web.archive.org/web/20050105084938/http://www.wiscosurvey.com/ (2002-2005).*

(Continued)

*Primary Examiner* — Andre Boyce
*Assistant Examiner* — Nadja Chong Cruz
(74) *Attorney, Agent, or Firm* — Saliwanchik, Lloyd & Eisenschenk

(57) ABSTRACT

The subject invention relates generally to satisfaction metrics, their methods of administration, and computer programmable products loaded with the satisfaction metrics. The satisfaction metrics of the subject invention allow the participant to assess his or her satisfaction with general and specific attributes of any organization and to assign a relative value to the attribute relative to the other attributes. A weighted satisfaction score can be computed from the relative values and raw satisfaction scores of the general and specific attributes.

10 Claims, 11 Drawing Sheets

OTHER PUBLICATIONS

New Version of Confirmit Increases User Productivity Up to 80 Percent PR Newswire. New York: Nov. 29, 2004. p. 1.*

Inquisite Software Helps Fortune 2000 Companies Gather Strategic Information to Make Better Business Decisions PR Newswire. New York: Aug. 27, 2001. p. 1.*

Scantron Releases eListen 4.7 Survey Solution With Enhanced PDA Support PR Newswire. New York: Mar. 4, 2003. p. 1.*

Zahedi, Reliability metric for information systems based on customer requirements, The International Journal of Quality & Reliability Management, 1997.*

Robson et al., Does quality drive employee satisfaction in the UK learning sector?, The International Journal of Quality & Reliability Management; 2005.*

Bhave, Ashish, Customer Satisfaction Measurement, Quality & Productivity Journal, Feb. 2002.*

Linda Westfall, Software Customer Satisfaction, the Westfall Team, Dec. 30, 2002.*

Atkinson et al., Hierarchical Construct Validity of the Treatment Satisfaction Questionnaire for Medication (TSQM Version II) among Outpatient Pharmacy Consumers, Value in Health, vol. 8, 2005.* http://qsample.com/sample/ Question Types: Side-by-Side Matrix (2006).*

Hierarchical models for survey data http://web.archive.org/web/20000816225820/http://www.fas.harvard.edu. (Aug. 16, 2000).*

* cited by examiner

SATISFACTION METRICS AND METHODS OF IMPLEMENTATION

COPYRIGHT NOTICE

A portion of the disclosure of this patent document contains material that is subject to copyright protection. The copyright owner has no objection to the reproduction by anyone of the patent document or the patent disclosure as it appears in the Patent and Trademark Office patent file or records, but otherwise reserves all copyright rights whatsoever.

TECHNICAL FIELD

The present invention relates to methods and metrics for assessing satisfaction, in particular, for assessing employee satisfaction, and to computer readable mediums, computer implemented systems, and methods that enable an organization to assess satisfaction using a hierarchical-based survey.

BACKGROUND ART

Knowledge of individual satisfaction is necessary for the success of any organization. For example, employee satisfaction has been linked with employee motivation, performance, initiative, creativity, and retention. Thus, systems for assessing employee satisfaction provide a forum for employees to express and compare concerns/appreciation as well as a means for management to monitor employee satisfaction, address areas for improvement, and compare employee satisfaction with industry-wide standards.

Systems and methods for monitoring individual satisfaction (for example, with a product, with an organization, etc.), including employee satisfaction in the workplace, are well known and widely practiced. A common method of receiving feedback from employees, patrons, clients, and/or customers of an organization is through the use of paper response forms. For example, comment cards are provided by an organization to its customers and/or employees to assess areas for improvement (i.e., services, products, environment, etc.). Unfortunately, the inconvenience to either the customer and/or the employee of filling out a response form have reduced the effectiveness and/or accuracy of the comments received. Further, employees are often reluctant to criticize features of the organization, lending to greater inaccuracies in response.

Other conventional surveys are disclosed in U.S. Pat. Nos. 5,615,134 and 6,026,387, in which computers are utilized to provide questions and gather answers to such questions. Unfortunately, employees and/or customers are less likely to participate in such electronic (or automated surveys) due to fears relating to confidentiality, difficulty of access, poor presentation of survey content, and/or inability to read ahead or scan the survey in its entirety prior to participation. Moreover, these patents describe evaluation models dependent on the question survey methods that lack a means for ascertaining the individual's sense of value for those questions provided.

In other instances, individual (or employee) satisfaction is evaluated by an outside consultant, which may require the consultant to travel to different geographical locations to assess a large operation with continuity. The consultant may also require the employee to stop productive work to allow time for the assessment review. It is time-consuming and often expensive for an independent consultant to conduct individual employee interviews, record the data, and assemble the information into a useful form. Furthermore, should a business wish to conduct periodic evaluations, there is no guarantee that the same consultant will be available. Therefore, the organization cannot be assured that the next independent assessment performed will have the same consistency. Nor is there any assurance that secondary evaluations will produce meaningful results comparable to previous exercises.

Even with valid data successfully obtained by independent consultants, a still further challenge is faced in presenting the results in a manner that is readily understood and that could be compared to other evaluations that have been performed. For example, the results of an evaluation survey conducted by one organization may not be comparable to the results of an evaluation conducted by a second organization, which may have a drastically different culture and mission from that of the first organization. Thus, there is a need for evaluation methods in which the value of the questions in the evaluation can be assessed so as to appropriately weight the responses.

Further, such evaluation surveys generally do not offer feedback regarding the results of the evaluation. Thus, participants in an evaluation feel disenfranchised from the process and will be more reluctant to expend the time and energy to provide constructive answers in an evaluation.

Accordingly, there is a need in the art for an evaluation system that is easily administered, that can be scored using a valuation system that is applicable to other evaluation methods that have been administered, and that can be accurately scored. Specifically, evaluation systems are needed that can generate satisfaction scores on a hierarchical level based on participant valuation.

SUMMARY OF THE INVENTION

The present invention provides satisfaction metrics useful for measuring participant satisfaction with an attribute and the participant's value of importance for that attribute. Advantageously, the satisfaction metrics of the present invention combine evaluation of an attribute's value with satisfaction with the attribute. In accordance with the present invention, a participant is presented with hierarchies of attributes relating to an organization using a data-gathering interface. In a preferred embodiment, accompanying each attribute at the top of and within the hierarchy is a means for assessing value of each attribute. Along with presenting a raw value for an attribute, a participant also indicates a raw satisfaction score for the attribute. The weighted satisfaction score for an attribute is calculated from the raw satisfaction score and the participant's relative value of the attribute in relation to other attributes. The data-gathering interface may utilize, for example, an Internet web server, a touch-tone telephone entry system, a paper and pencil system that compiles the answers by scanning them automatically, and other existing or to-be developed interface means.

The present invention also encompasses metric management systems and methods for implementing the satisfaction metrics. In one embodiment, the metric management systems are web-based, which allows capturing, storing, combining, and comparing the satisfaction metrics of individual participants.

Other aspects and advantages of the invention will become apparent from the following detailed description taken in conjunction with the accompanying drawings, illustrating, by way of example, the principles of the invention.

BRIEF DESCRIPTION OF THE DRAWINGS

In order that the manner in which the above-recited and other advantages and objects of the invention are obtained, a more particular description of the invention briefly described above will be rendered by reference to specific embodiments thereof including those that are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The present invention relates to satisfaction metrics and methods for implementing the satisfaction metrics. In a specific embodiment, the metric is an employee satisfaction metric. Advantageously, the satisfaction metrics can be utilized to assess satisfaction with a variety of professional and personal areas, for example and without limitation, satisfaction with schools, quality of government, customer service, churches, quality of life, etc.

One aspect of the present invention is directed to psychometric systems for assessing satisfaction with an organization. The system comprises a survey administered to participants that allows the participants to assess their individual satisfactions and dissatisfactions with a set of attributes.

Within this metric, the attributes are grouped in hierarchies. Advantageously, the satisfaction metric can be linear, two-dimensional, or a combination of both, For example, in one embodiment for a two-dimensional metric, a plurality of specific (or grandchildren) attributes are organized together and grouped under a single child attribute. Each child attribute is further organized and grouped together under a general (or parent) attributes. As the hierarchy grows upward, each level of attributes becomes successively more generic. This organization and grouping of two-dimensional hierarchies can continue until the listing of attributes is exhausted. Likewise, for a linear system, each group of attributes has substantially the same specificity in describing the organization. Advantageously, a metric that combines aspects of both linear and two-dimensional organization thoroughly defines the group to be assessed.

Advantageously, the metrics of the present invention allow the participants to assign a raw value of the attribute's importance relative to other attributes in its same hierarchy. This allows for a more standardized assessment for comparison against other surveys. The skilled artisan would understand that any number of levels of hierarchies can be created that define the attributes of an organization.

For illustrative purposes, the embodiments and figures disclosed herein are related to employee satisfaction metrics. However, the skilled artisan should understand that the present invention is not limited to employee satisfaction metrics, but to metrics for any type of organization. These organizations include, without limitation, schools, religious organizations, non-profit agencies, governmental agencies, trade associations, and lobbying groups.

Figure 1:
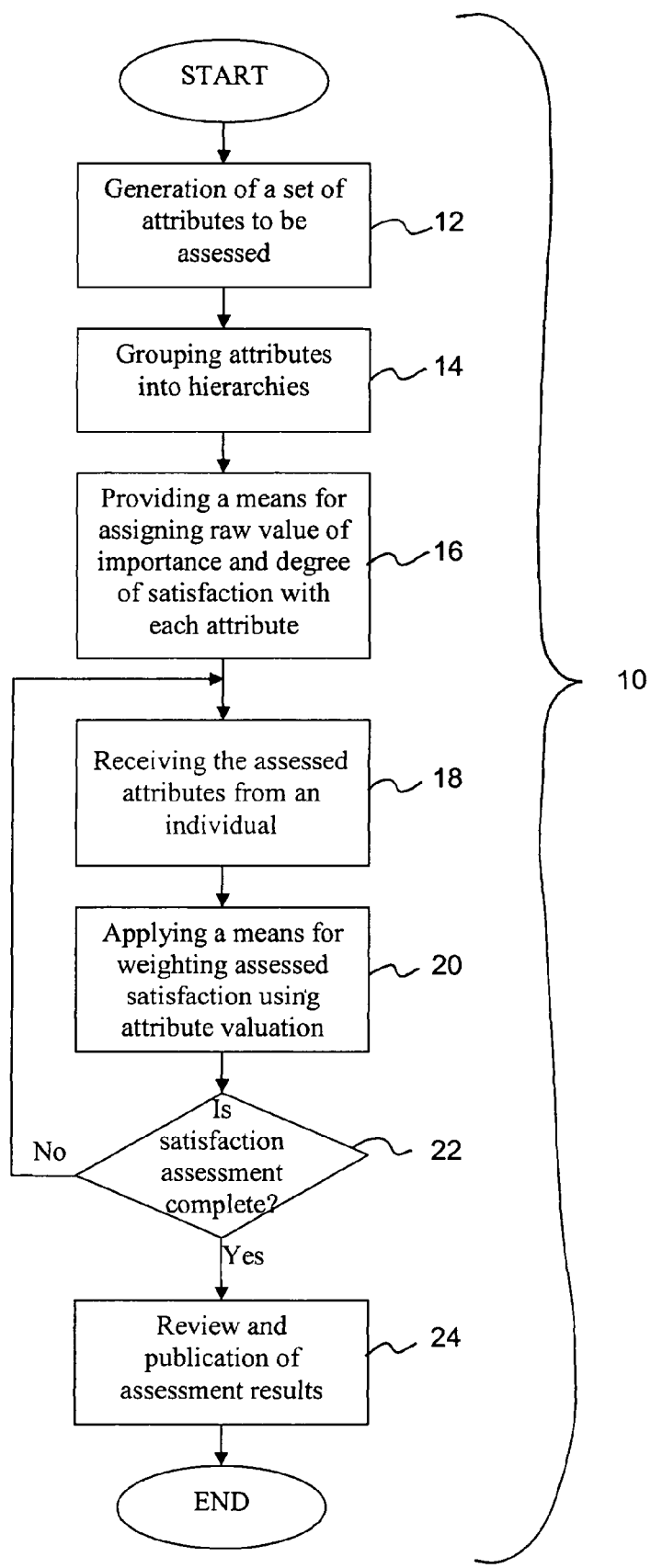
FIG. 1 illustrates a flow diagram of a specific embodiment of the present invention.

Referring to FIG. 1, the satisfaction metric of a specific embodiment of the present invention is generally shown as 10. In some embodiments, the attributes for evaluation are generated 12 by, for example, the metric administrators or consultants. The satisfaction metrics further comprise grouping the attributes into hierarchies 14. This encompasses grouping grandchildren attributes underneath a single child attribute and grouping each of the child attributes under a parent attribute. In some instances, a child attribute has no grandchild attributes grouped under it; in other instances, a child attribute has two or more grandchild attributes grouped under it. Advantageously, the satisfaction metrics of the present invention provide the user with a means for assigning value and degree of satisfaction to each attribute 16. The satisfaction metric of FIG. 1 further receives the assessed attributes from a participant 18. The satisfaction metric includes a means for weighting the degree of satisfaction with the valuation 20. The metric also allows the participant to reenter the assessment for review and revision 22. Compilations of assessments are combined and published for review 24.

In a preferred embodiment for employee satisfaction metrics, the survey of the present invention includes a hierarchy of career attributes for a plurality of parent career attributes, a plurality of child career attributes, and a plurality of grandchild career attributes. All attributes are maintained in a master generic attribute set. The attributes are grouped, at a minimum, in hierarchies having one general attribute (the parent) and a subset of children attributes. The satisfaction metric may further comprise an additional layer wherein a plurality of grandchild attributes is grouped under a child attribute. In a certain embodiment, each layer in the hierarchy contains at least two attributes but no more than six attributes. Thus, specific embodiments may have two attributes, three attributes, four attributes, five attributes, or six attributes grouped under a parent or child attribute. Advantageously, limiting the number of attributes in a hierarchy makes it feasible to assign raw values of importance to the attributes.

An employee satisfaction hierarchy useful for the satisfaction metrics of the present invention is illustrated as follows. Six exemplary general (or parent) attributes are presented (for example, meaningful work, compensation and benefits, career future, corporate management, and environment) that are pertinent in determining an employee's satisfaction with his or her career and workplace. Grouped underneath the general attributes are child attributes only, as in the case of meaningful work, or a plurality of child attributes that are further organized into specific (or grandchild) attributes. This listing is merely illustrative and should not be interpreted to include every attribute pertinent to an employee satisfaction metric.

EMPLOYEE SATISFACTION
  MEANINGFUL WORK
  My work is meaningful to society.
  My work interests me.
  My job challenges me.
  The company's products are recognized by the industry.
  COMPENSATION AND BENEFITS
  Pay
  My pay is fair for my performance.
  My pay compares favorably with similar jobs locally.
  My pay compares favorably with similar jobs nationally.
  Overtime work is paid.
  The performance review process is administered fairly and affects my compensation.
  The company employs appropriate bonus programs.
  Benefits and Personal Services
  Adequate medical insurance is provided.
  Adequate dental insurance is provided.
  Adequate vision insurance is provided.
  The company offers an onsite Fitness Center
  The company offers onsite Child Care.
  The company offers Tuition Reimbursement or other Educational Programs
  Retirement Plans
  The company offers an adequate 401(k) Retirement Plan.
  The company offers an Employee Stock Ownership Plan or stock options.
  The company offers other retirement programs.
  CAREER FUTURE
  Job Security
  The Company's economic outlook is stable.
  Turnover within the company has been fair and reasonable.
  The company offers a diverse product line for its industry.
  The company is growing.
  The company is committed to increased profitability.
  The company competes successfully for market share.
  Opportunities for Advancement
  My position allows for professional or personal growth.
  The company offers employees advancement potential in other positions.
  The company's growth plan promotes future career advancement opportunities.
  Advancement opportunities are awarded to the most capable candidates.
  Personal Growth
  The company provides employees with the training necessary to fulfill job responsibilities.
  Employees can attend industry-related courses and seminars.
  Coworkers provide learning opportunities.
  The company encourages employees to achieve personal goals within the organization.
  The work I do confers professional status within the company or the industry.
  The company and its managers encourage employees to learn new skills even if those skills are not job related.
  Personal Recognition
  My Manager recognizes me for the work that I accomplish.
  The company recognizes personal and professional achievement to fellow employees.
  The company solicits and uses employees' suggestions for making improvements.
  CORPORATE MANAGEMENT
  Vision, Strategy, Planning, and Organization
  The company presents a clear picture of its future.
  The company presents a clear strategic plan for achieving its long-term goals.
  The company commits to thorough product planning.
  The company is committed to standards of high quality.
  The company's organizational structure is appropriate for its operation.
  The company's leaders manage people and resources responsibly.
  Systems
  The organizational structure encourages creativity.
  Policies and procedures can be changed easily.
  The company encourages suggestions for improvements to policies and procedures.
  Employees have access to the resources they need in order to do their jobs well.
  Resources and tools are easy to find and use.
  The company's procedures are complete and professional.
  Culture
  The company encourages employees to express alternative views.
  The company has effective communication between departments.
  The company places a high value on customer service.
  The company places a high value on the needs of its employees.
  The company conducts meaningful and productive employee satisfaction surveys.
  Supervision
  The company's leaders are empowered to make decisions related to their areas of responsibility.
  The company's leaders motivate employees effectively.
  The company's leaders have good administrative skills.
  The company's leaders are approachable by employees.
  The company's leaders encourage individual initiative and responsibility.
  Ethics
  The company operates openly and honestly to employees and customers.
  The company honors commitments to its employees.
  The company honors commitments to its customers.
  The company documents what it does and supports those policies and procedures.
  ENVIRONMENT
  Morale
  Co-workers are challenging, stimulating, and friendly.
  The company does not promote favoritism.
  The company does not promote "office politics."
  Employees engage in sufficient social interaction within the workplace.

The level of stress among employees is reasonable.
Employees are committed to completing high-quality work.
Working Conditions
The company provides comfortable and effective workspace to its employees.
My workspace compares favorably to similar positions in other local companies.
My workspace compares favorably to similar positions nationally.
The company promotes a healthy working environment.
The workplace contributes positively to productive job performance.
The workplace contributes positively to personal and professional development.
Location
The location of the company has a favorable climate.
The community offers a standard of living favorable to my needs and my budget.
The community is clean and safe.
The community offers adequate education resources for my needs.
The community offers adequate leisure and/or cultural activities for my needs.
The community offers favorable career opportunities for my needs or my family's needs.

Other useful general attributes for assessing a workplace may include the Baldrige Assessment criteria—leadership, strategic planning, customer and market focus, information and analysis, human resource development and management, process management, and business results.

Any organization can utilize a hierarchical-based metric and a generic set of career attributes. Advantageously, the results of a metric utilizing a generic set of career attributes allows for comparison across broad categories of organizations and companies. Also, a generic set of career attributes can be continuously refined to clearly and concisely assess employee satisfaction.

The satisfaction metrics of the present invention provide means for the participant to assign raw values of importance for each attribute. For example, the most general (or parent) attributes are each valued in relation to the other general attributes, the child attributes are each valued in relation to the other child attributes, and the most specific (or grandchild) attributes are each valued in relation to the other specific attributes within the hierarchy. The values are then converted into a relative value for each attribute.

The means by which a raw value can be assigned varies. In one embodiment, a horizontal bar graph is positioned adjacent to the attribute in question. Preferably, the graph is a custom control on a graphical user interface or a website where satisfaction is indicated by positioning a cursor over the correct area of the graph and left-clicking. The area between the cursor and one end of the graph is shaded or filled with a contrasting color. The ends of the bar graph reflect extremes in an importance ranking. For example, the left end corresponds to no importance, and the right end corresponds to utmost importance or vice versa. A raw value is assigned by marking a position on the graph that indicates the degree of importance within the graph or at the extremes of the graph. Following the participant's assignment of raw values to the specific attributes within a hierarchy, the satisfaction metric automatically weighs each value relative to the other values in the hierarchy. This weighing can take place automatically after the final raw value has been assigned. Optionally, the weighing takes place when the participant progresses to the next hierarchy or when the participant exits the metric. After weighting, the total shaded area in each of the attributes in any single hierarchy must be equivalent to an entirely shaded graph. It is to be understood that the graph can be positioned vertically.

Optionally, the assigned raw values on the graph can be transposed into an equivalent numeric value and used in subsequent calculations. In this embodiment, the end of the graph that represents no importance is equivalent to zero. The opposite end that represents utmost importance is equivalent to some arbitrary number, for example, 100. After weighting, the sum off all the weighted values within a hierarchy should be equal to the arbitrary number, in this instance, 100.

In another embodiment, the raw value is assigned a number on a scale. For example, a blank is adjacent to the attribute in question to fill in the raw value, and the scale is any number between zero and an arbitrary number like 100 with zero corresponding to no importance and 100 corresponding to utmost importance. It is to be understood that any numeric scale can be used within this embodiment. After weighting, the sum of the relative values of the attributes must equal the arbitrary number in this embodiment.

Preferably, the means by which a value is assigned is identical for assigning values to general attributes and specific attributes.

Figure 2:
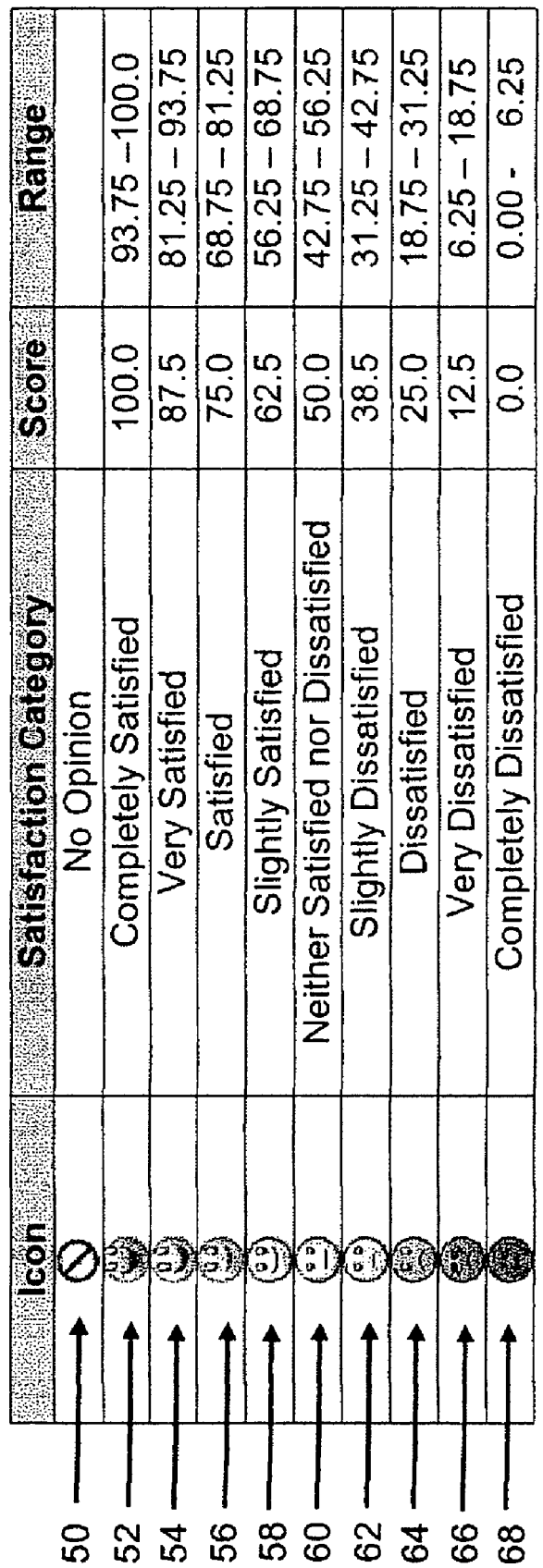
FIG. 2 illustrates ten different icons that a participant may select to indicate his or her degree of satisfaction with the queried attribute in a specific embodiment of a satisfaction metric.

The survey of the present invention provides means for the participant to assess his or her individual satisfaction with a particular specific career attribute. In one embodiment, the means comprises a plurality of icons (FIG. 2). The participant selects the icon that most identifies with his or her degree of satisfaction. The icons represent the degree of satisfaction the participant has with a particular specific attribute. Referring to FIG. 2, icon 52 indicates "completely satisfied", icon 54 indicates "very satisfied", icon 56 indicates "satisfied", icon 58 indicates "slightly satisfied", icon 60 indicates "neither satisfied nor dissatisfied", icon 62 indicates "slightly dissatisfied", icon 64 indicates "dissatisfied", icon 66 indicates "very dissatisfied", and icon 68 indicates "completely dissatisfied." The wide range of options and degrees of satisfaction that correlate with each icon beneficially yields a more accurate survey because the participant has a range of choices that more clearly correspond with his or her opinions. Advantageously, if the career attribute is not applicable to the participant, icon 50 indicates "no opinion." Also, the use of icons benefits the global work environment where all employees may not speak the same language or have a complete understanding of written language.

In another embodiment, the degree of satisfaction is indicated by selecting word choices. The word choices can include, without limitation, "completely satisfied", "very satisfied", "satisfied", "neither satisfied nor dissatisfied", "slightly dissatisfied", "dissatisfied", "very dissatisfied", "completely dissatisfied", and "no opinion."

In yet another embodiment, the degree of satisfaction is indicated with a numeric value. For example, a satisfaction is ranked on a scale of zero to 100 with zero corresponding to completely dissatisfied and 100 corresponding to completely satisfied. The participant is able to choose a number within or at the extremes of the range.

When the embodiments are directed to icon or word based descriptors, the employee satisfaction system converts the satisfaction assessment into a numeric value. Each degree of satisfaction represents a numeric range, and the system uses the median value of the range for any further computations. FIG. 2 illustrates two embodiments for icon and word based descriptors and their equivalent numeric ranges and median values.

The metrics of the present invention provide means for the participant to provide comments in his or her own words. It is to be understood that the means for commenting can be located anywhere on the survey so long as there are means to identify which comment area corresponds with which attribute. In one embodiment, a comment box is located adjacent to the means for assigning value. In yet another embodiment, the comment box is located adjacent to the means for assigning satisfaction. In yet another embodiment, the comment box is located adjacent to the attribute name. In a computer environment, the comment box includes means to enlarge the area for additional comments.

In a computer based embodiment, a link entitled "COMMENTS" allows the participant to access a pop-up comment box or comment screen when the link is selected. In another computer based embodiment, a pictorial icon opens a comment box or comment screen. There is also means for enlarging the comment area for additional statements.

One embodiment of the comments means requires bivalent comment fields. For example, the comment box prompts for a positive comment followed by negative comment. Preferably, the employee satisfaction system offers some means to check spelling and/or grammar in a computer-based survey.

The satisfaction metrics of the present invention further comprise means to weigh the assessed satisfaction using the attribute's relative value. In a specific embodiment, the participant's assigned values are weighted to determine the absolute value of an individual attribute. The valuation calculation comprises multiplying the relative value of a specific attribute and all of the relative values of the attributes above it in the hierarchy to determine an absolute value. The satisfaction score is then multiplied by the absolute value to yield a weighted satisfaction.

In another embodiment, an attribute's satisfaction score is weighed by its relative value to yield a weighted satisfaction. In the specific embodiment where the value scale is a numeric range between 0 and 100 with 0 indicating no value and 100 indicating utmost value, the weighted satisfaction score is calculated by multiplying the numeric equivalent of the raw satisfaction icon, as illustrated in FIG. 2, with the relative value and dividing by 100. The weighted satisfaction score of each attribute within a hierarchy are then added together to provide a satisfaction of the attribute above it in the hierarchy. For example, a child attribute hierarchy contains two to six grandchild attributes. The weighted satisfaction score for each grandchild attribute is combined to provide a satisfaction score for the child attribute.

Figure 3A:
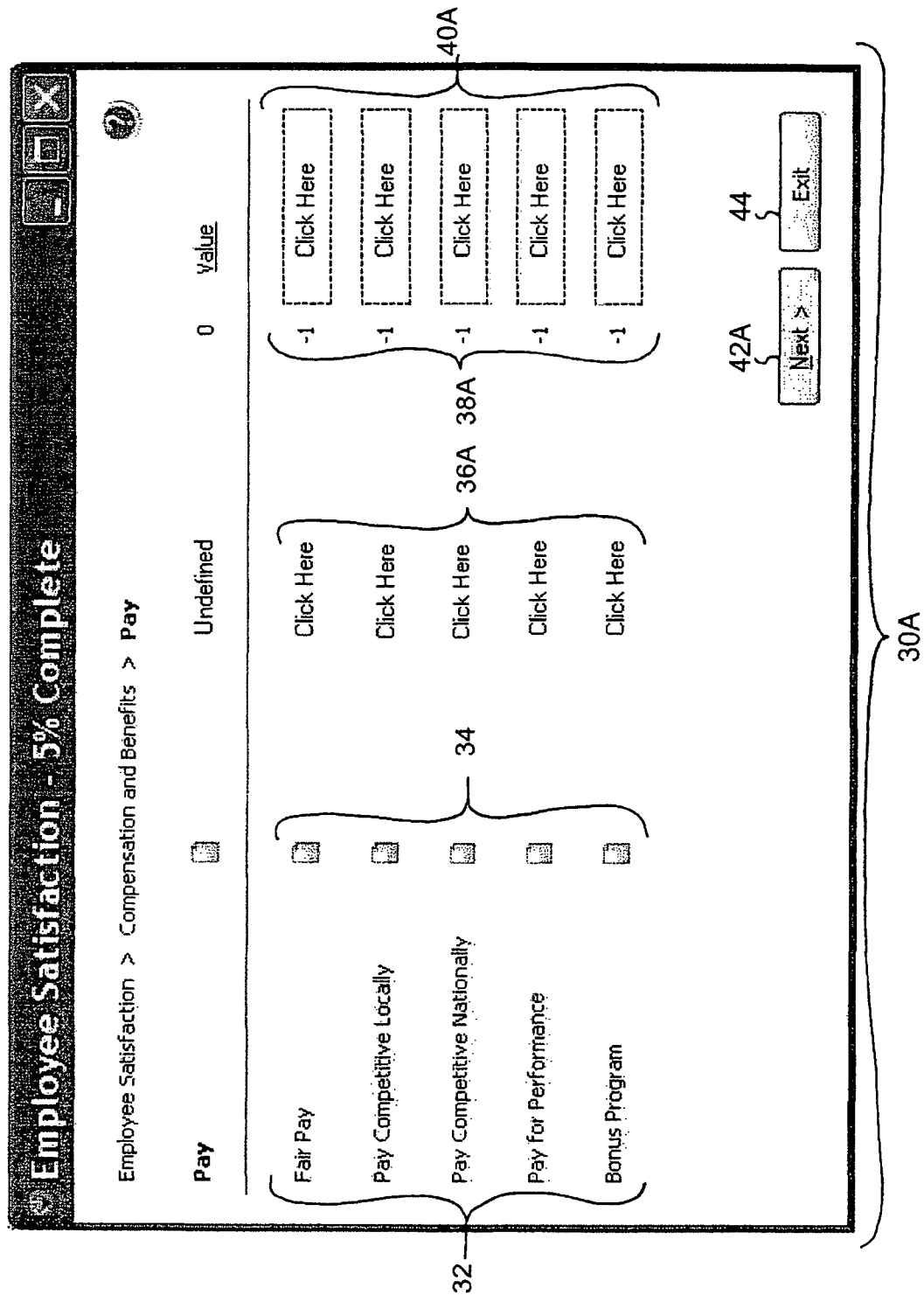
FIG. 3A illustrates a graphical interface screen that prompts the participant to provide raw values for specific attributes that are grouped together under the "Pay" hierarchy. This screen is appropriate for a satisfaction metric utilized in an employee/employer setting.

Referring to FIG. 3A, satisfaction metric screen 30A provides a computer-based embodiment of a metric as viewed by the participant before he or she begins assessing the "Pay" hierarchy. 30A provides a computer-based screen of a hierarchy of a child attribute (for example, pay) and its grandchild attributes 32. The screen also shows the relation between the child attribute "Pay" and its general attribute "Compensation and Benefits." 30A gives the participant the option of providing comments for each individual grandchild attribute 32 by selected the appropriate pictorial icon 34. 34 provides access to a comment box or screen. By positioning a cursor over the words "Click Here" as indicated by 36A, a table of pictorial icons as shown in FIG. 2 is provided so that the participant may visually indicate his degree of satisfaction. 38A represents a numeric equivalent for the value graphs indicated as 40A. 42A represents a disabled link to the next unassessed hierarchy. 44 represents a link that allows the participant to exit the satisfaction metric without finishing the metric.

Figure 3B:
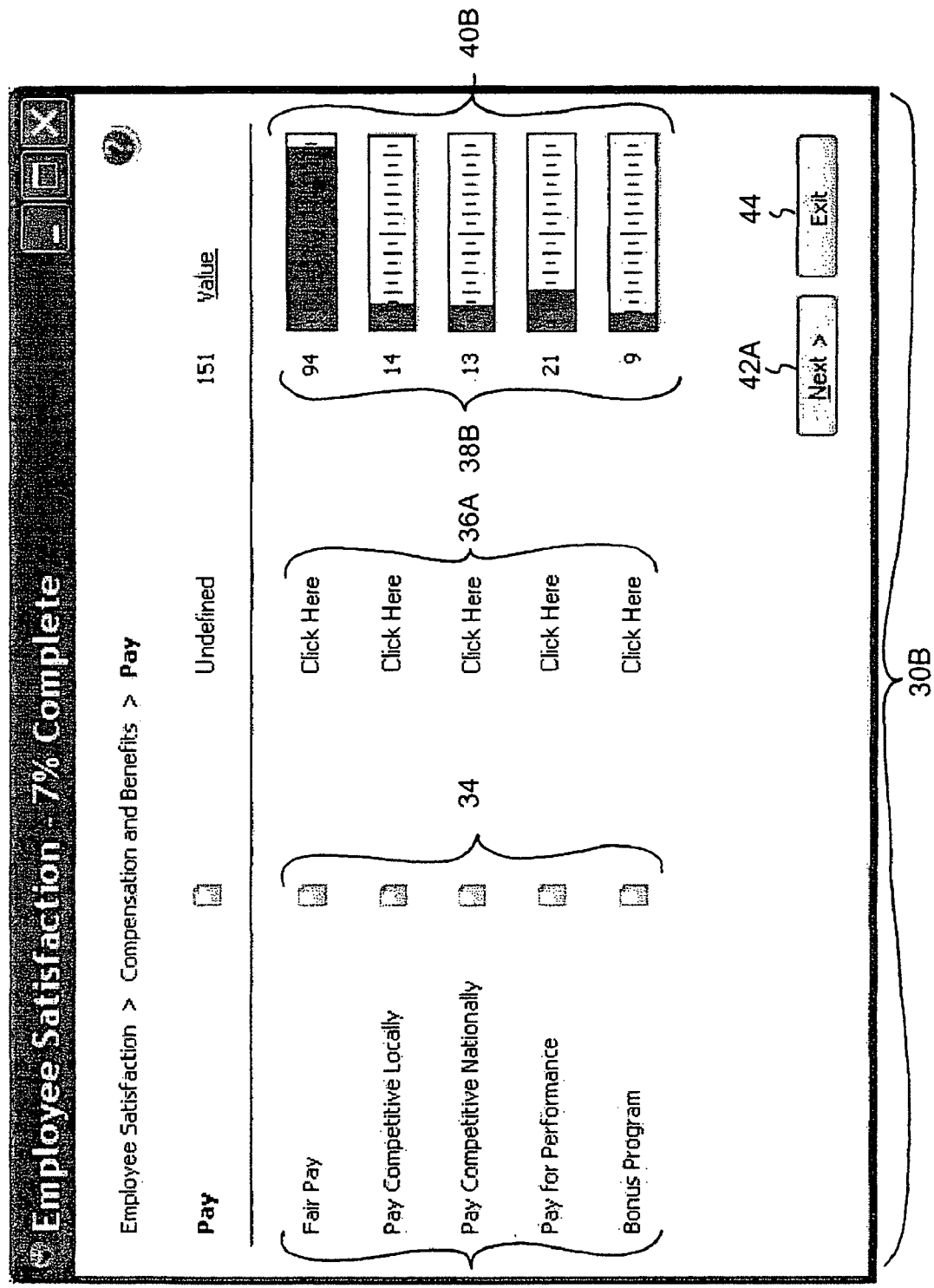
FIG. 3B illustrates the graphical interface screen of FIG. 3A after the participant has provided assessments for the value for each specific attributes grouped under the "Pay" hierarchy. Please note that in this illustration the values are shown as their raw values (i.e., they do not indicate the relative value of each specific attribute in relation to one another).

Referring to FIG. 3B, 30B represents a partially completed assessment of the "Pay" hierarchy and the grandchild attributes 32. 40B shows the value graphs where the participant indicates the raw value of each attribute. 38B shows the numeric equivalent of the position on the respective value graphs where the graphs are used to arbitrary represent a numeric scale of zero to 100, wherein zero represents no raw value and 100 represents utmost raw value. This embodiment shows 38B as converted, numeric raw values, so the sum of each of the raw values is more than one (in this instance, 151). On this screen, degree of satisfaction 36A has not yet been assigned; accordingly, link 42A for accessing the next hierarchy is still disabled. The participant does have the option to exit the metric completely by selecting link 44. Pictorial icon 34 provides access to a comment box or screen.

Figure 3C:
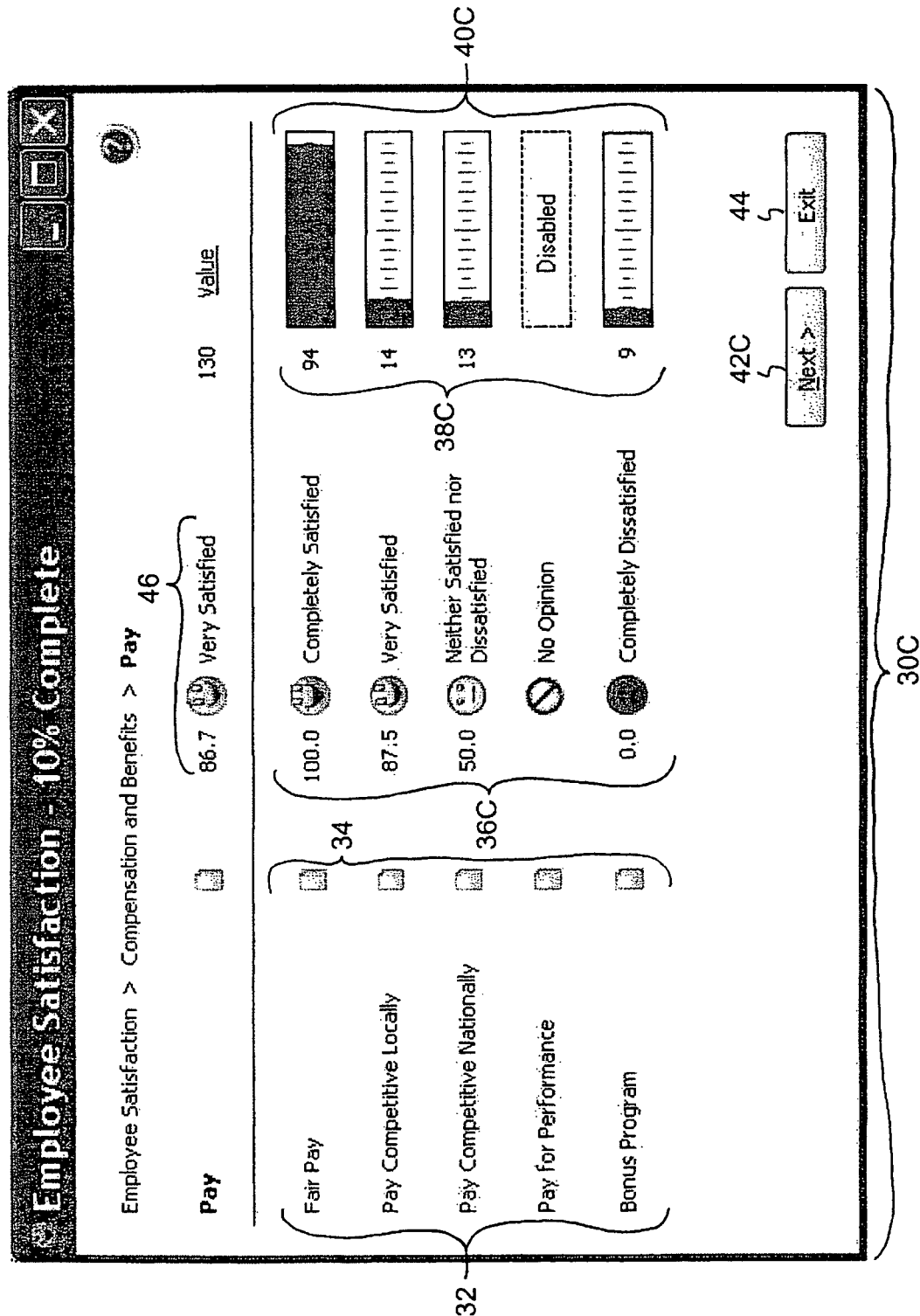
FIG. 3C illustrates the graphical interface screens of FIGS. 3A and 3B after the participant has indicated satisfaction with each specific attribute grouped under the "Pay" hierarchy. This figure further illustrates that an indication of no opinion for an attribute will automatically disable the valuation of that attribute.

Referring to FIG. 3C, 30C represents a completed assessment of the grandchild attributes 32 of the "Pay" hierarchy. The raw degrees of satisfaction have been indicated on 36C. The screen 30C automatically displays a numeric equivalent of the selected satisfaction icon based on the median value shown in FIG. 2. When the degree of satisfaction is given as "No Opinion," the corresponding value graph is disabled. Accordingly, the satisfaction score 46 for "Pay" is calculated as if it had only four specific attributes rather than five. Although not shown on screen 30C, the satisfaction metric converts the raw value to a relative value by dividing each raw value by the sum of each the raw values in the hierarchy. The "Pay" satisfaction score 46 is then calculated by first calculating an individual weighted satisfaction score for each attribute by multiplying the relative value by the numeric equivalent of the raw degree of satisfaction 36C and then adding the individual weighted satisfaction scores to arrive at the "Pay" satisfaction score 46. 46 can also be represented by the equivalent pictorial icon by placing the numeric value for 46 in the correct range that the icon represents as shown in FIG. 2. Since this hierarchy is completed, the participant may access the next hierarchy by selecting the link 42C. Alternatively, the participant may exit the satisfaction metric completely by selecting the link 44. Pictorial icon 34 grants access to a comment box or screen.

Although both degrees of satisfaction and raw value are decided by the participant for the bottom most layer of attributes, the participant is prompted to provide only values for each of the child attributes and each of the parent attributes.

Figure 4A:
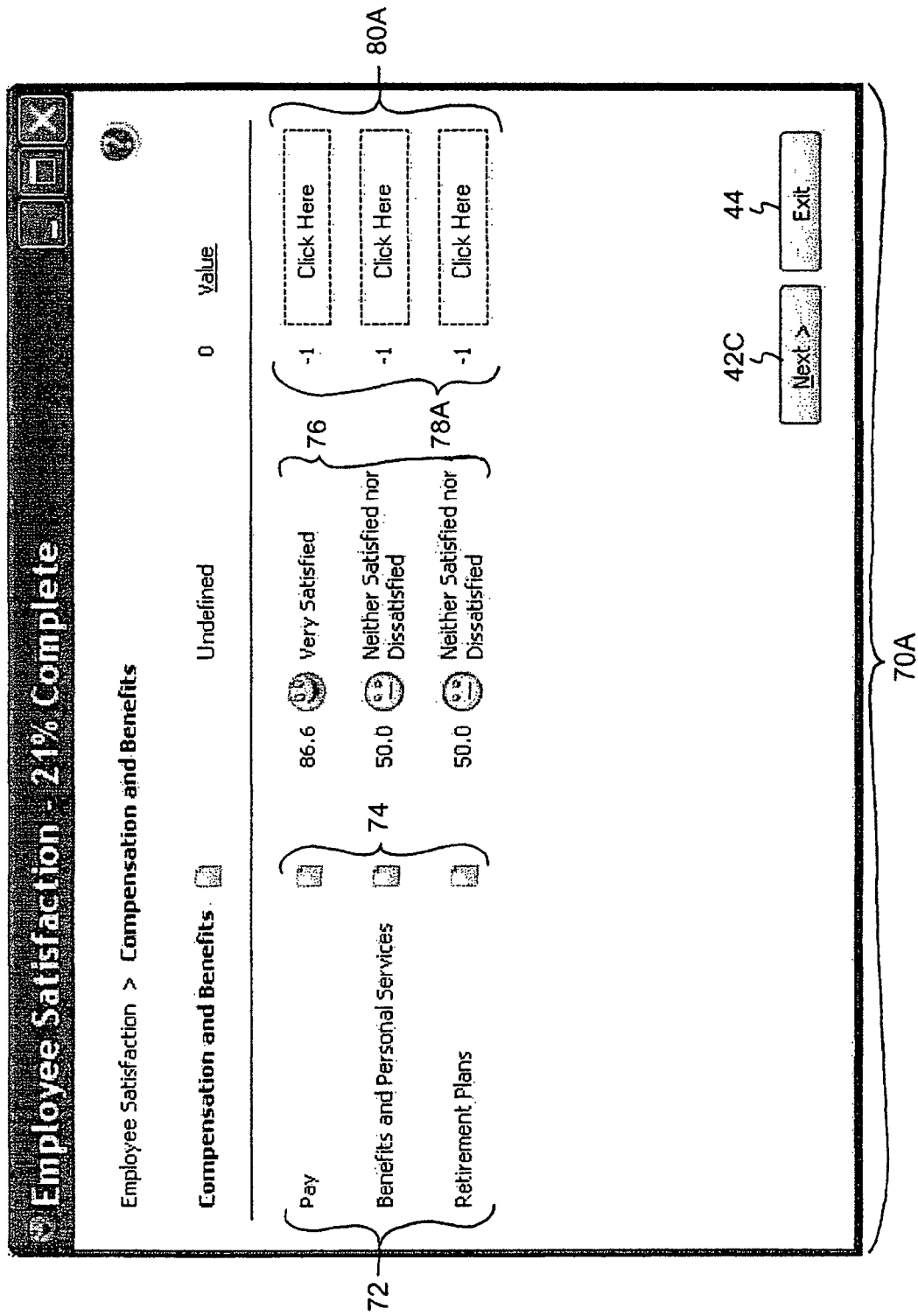
FIG. 4A illustrates a graphical interface screen that prompts the participant to provide his or her valuation of the children attributes. The degree of satisfaction is taken from the already assessed grandchildren (or specific) attributes.

Referring to FIG. 4A, 70A represents an uncompleted screen for a hierarchy of a parent attribute (that is, Compensation and Benefits) and its child attributes 72. Comments for each child attribute can be provided by selecting the appropriate icon indicated by 74. The degrees of satisfaction 76 for each child attribute 72 are shown numerically and pictorially. 76 is calculated from each hierarchy for the child attributes 72. The participant is prompted to provide values for each child attribute 72 on the value graphs 80A represented at "Click Here." 78A represent the numeric equivalents for value 80A. 42C represents a disabled link to the next hierarchy. 44 allow the participant to exit the metric.

Figure 4B:
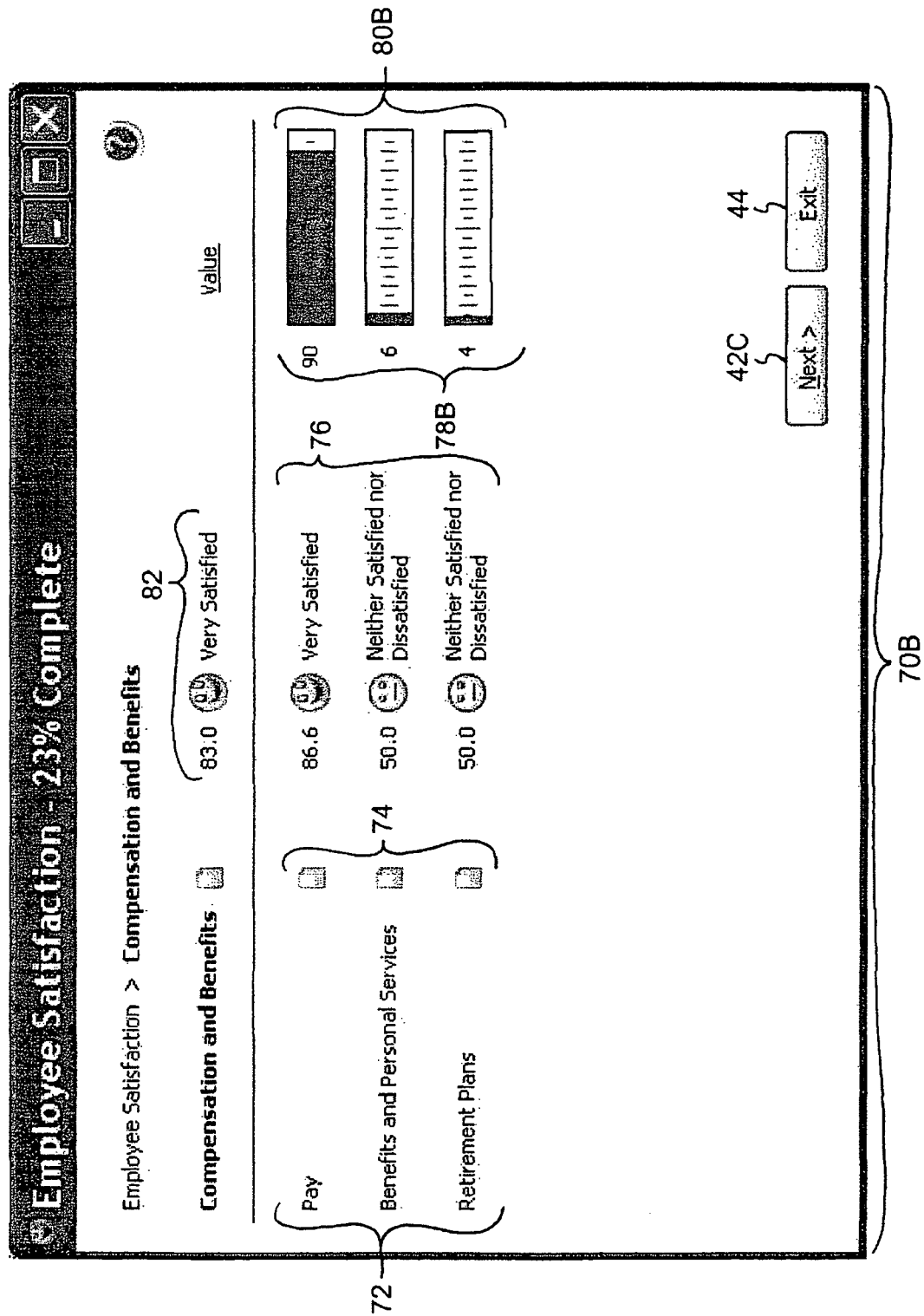
FIG. 4B illustrates the graphical interface screen of FIG. 4B after the participant has provided an indication of value for the three children attributes.

Referring to FIG. 4B, 70B shows a completed screen for a hierarchy of a parent attribute and its child attributes 72. The raw value for each child attribute is provided graphically 80B and numerically 78B, wherein the graph represents a number scale from zero to 100 with zero representing no value and 100 representing utmost value. The overall satisfaction score 82 for "Compensations and Benefits" is calculated internally. The numeric raw value 78B is converted to a relative value by dividing the raw value 78B for any one child attribute by the sum of all of the raw values 78B. The satisfaction score is weighted by multiplying the numeric value for satisfaction 76 by the relative value. The sum of all the satisfaction scores is shown numerically and pictorially as 82. 42C represents an active hyper text link to the next hierarchy, and 44 represents a link to exit this embodiment of the metric.

Figure 5A:
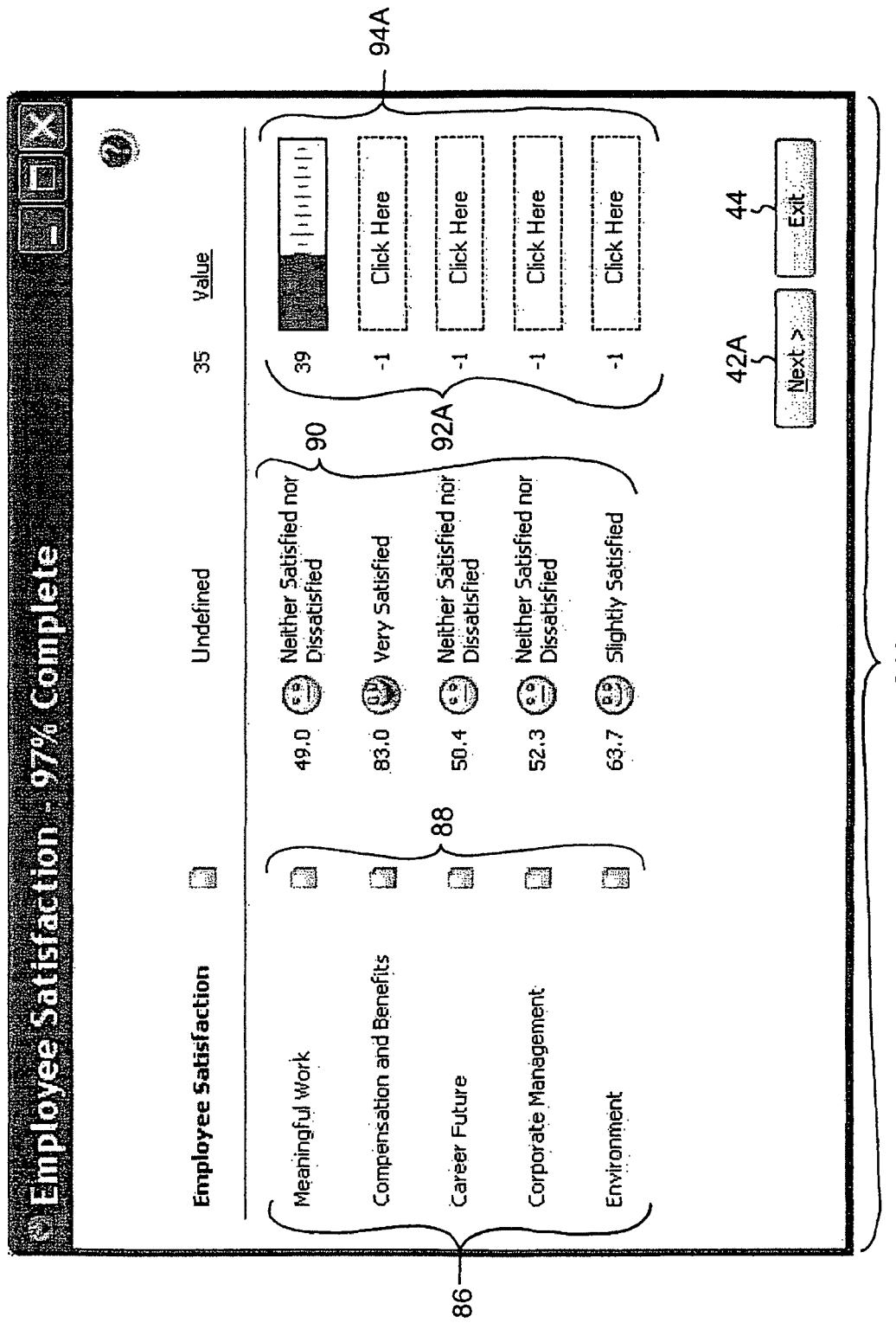
FIG. 5A illustrates the graphical interface screen that prompts the participant to indicate values for each of the parent (or general) attributes. The degree of satisfaction is taken from the already assessed children attributes.

Referring to FIG. 5A, a partially completed screen for assessing the total satisfaction (in this instance, Employee Satisfaction) from each parent attribute 86 is provided generally by 84A. The degree of satisfaction icons and their numeric equivalents 90 are calculated in the hierarchies for the parent attributes 86. Comments can be provided at 88. Although value is provided for one parent attribute, the remainder of the values can be provided at 94A. The numeric value equivalents are shown at 92A. 42A represents a link to the next screen, and 44 represents a link to exit this embodiment of the metric.

Figure 5B:
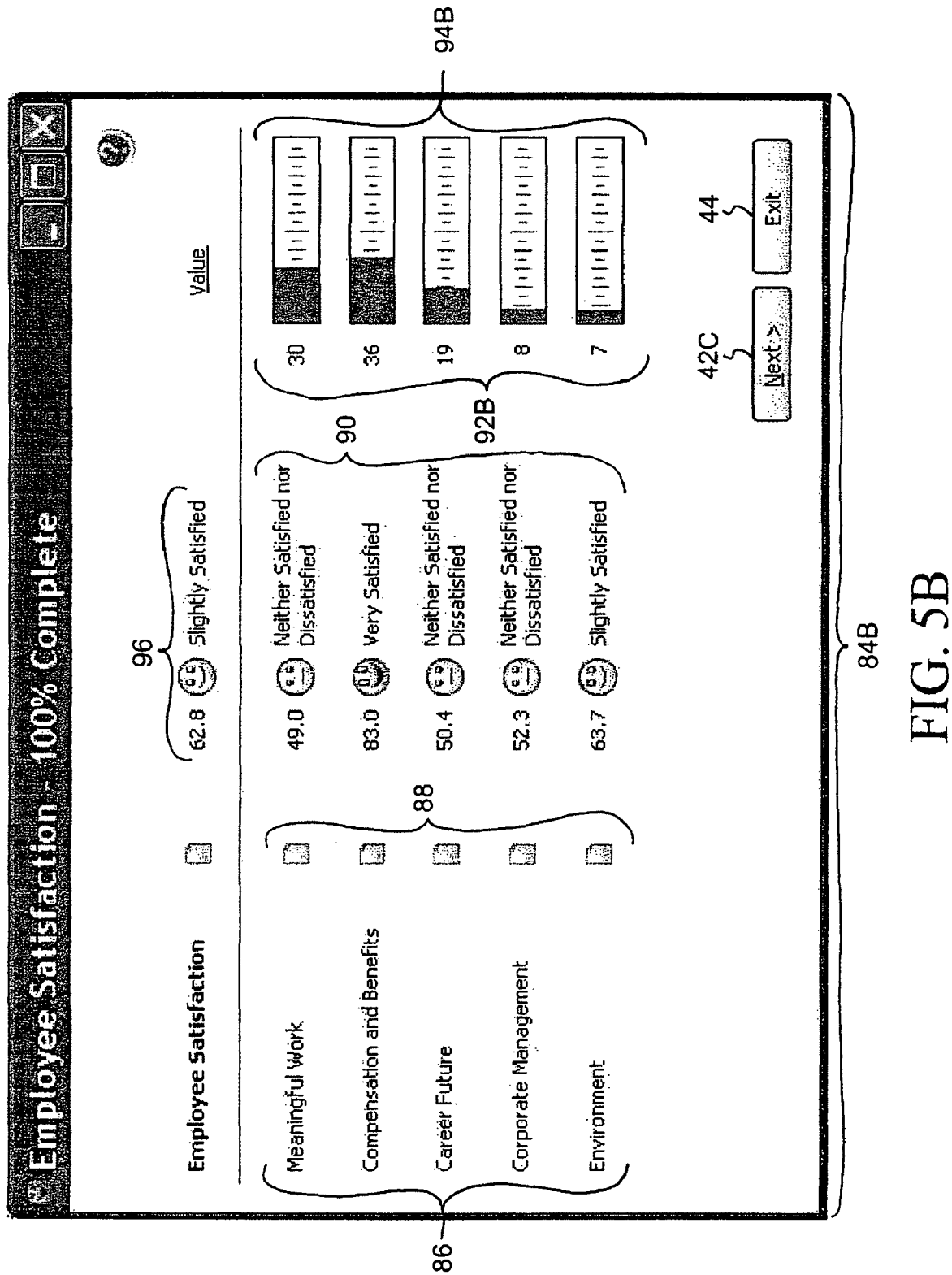
FIG. 5B illustrates the graphical interface screen of FIG. 5A after the participant has provided valuations for each of the general attributes.

Referring to FIG. 5B, a completed screen for assessing total satisfaction is provided generally at 84B. The raw values for each parent attribute 86 are provided graphically at 94B with the numeric equivalent at 92B, wherein the graph represents a number scale from zero to 100 with zero representing no value and 100 representing utmost value. The overall satisfaction score 96 for "Employee Satisfaction" is calculated internally. The numeric raw value 92B is converted to a relative value by dividing the raw value 92B for any one parent attribute by the sum of all of the raw values 92B. The satisfaction score is weighted by multiplying the numeric value for satisfaction by the relative value. The sum of all the satisfaction scores is shown numerically and pictorially as 96. 42C represents a link to the next screen, and 44 represents a link to exit this embodiment of the metric.

Figure 6:
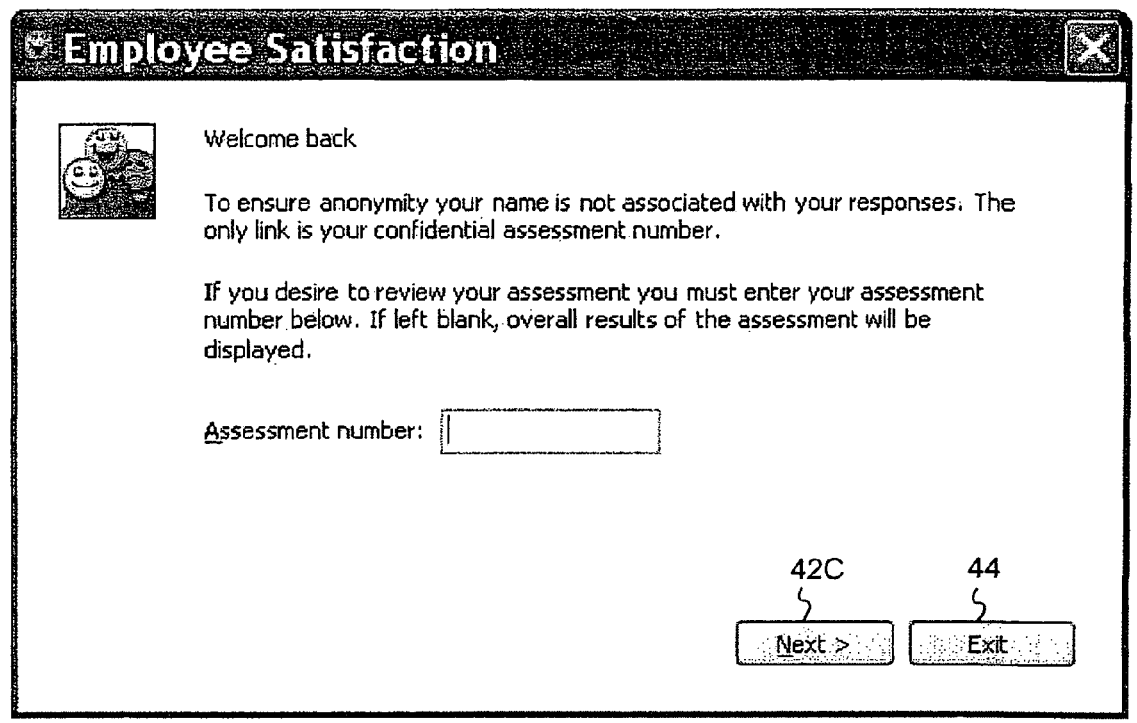
FIG. 6 illustrates a graphical interface that allows the participant to either review his or her assessment by providing an assessment number or review the total published results of the satisfaction metric of the organization.

If the participant wishes to access a previously started metric, he or she may enter the metric at the computer based screen shown in FIG. 6. Again, 42C represents a link to the next screen, and 44 represents a link to exit the metric.

Advantageously, both individual assessments and group assessments (that is, compilations of individual assessments) are weighted. Because the employee satisfaction system utilizes a generic set of attributes, diverse groups can be analyzed. For example, one group includes all department heads within an organization. Another group includes all members of a department. Yet another group includes all employees of an organization.

The satisfaction metrics further comprise review and publishing modes for the metric administrator. The metrics allow for a review stage where the comments are evaluated. At this stage, a comment can be redacted to remove any foul or obscene language. Particularly vicious comments can be relayed privately to the subject of the comments.

Figure 7:
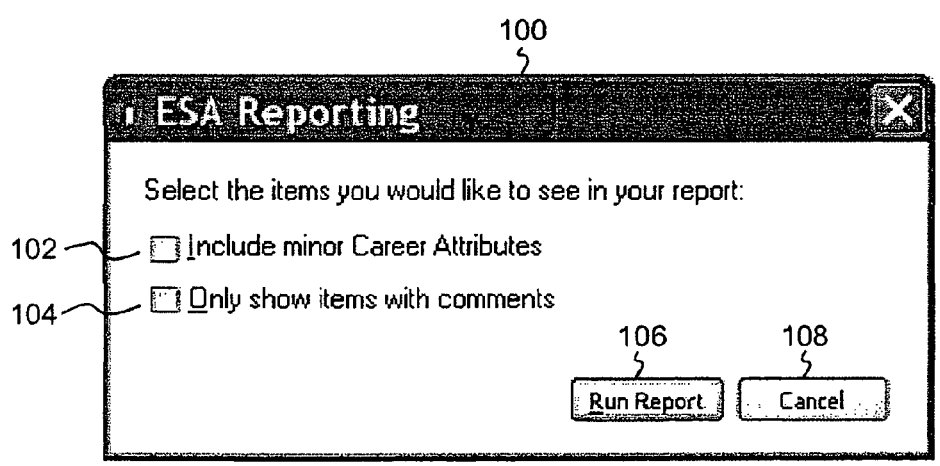
FIG. 7 illustrates a customized reporting feature of a computer-based embodiment of the present invention.

The publishing mode is directed to generating and displaying results of the survey. In one embodiment, the metric includes pre-defined reports. In another embodiment, the metric allows for custom reports. Referring to FIG. 7, in a computer-based system, screen 100 allows the system administrator to custom define reports. For example, selecting item 102 includes minor career attributes in the report. Minor career attributes can be defined elsewhere in the satisfaction metric. Selecting item 104 publishes items with comments. Item 106 is a link that initiates the report summary. Item 108 allows the administrator to cancel out of the ESA reporting page.

Figure 8:
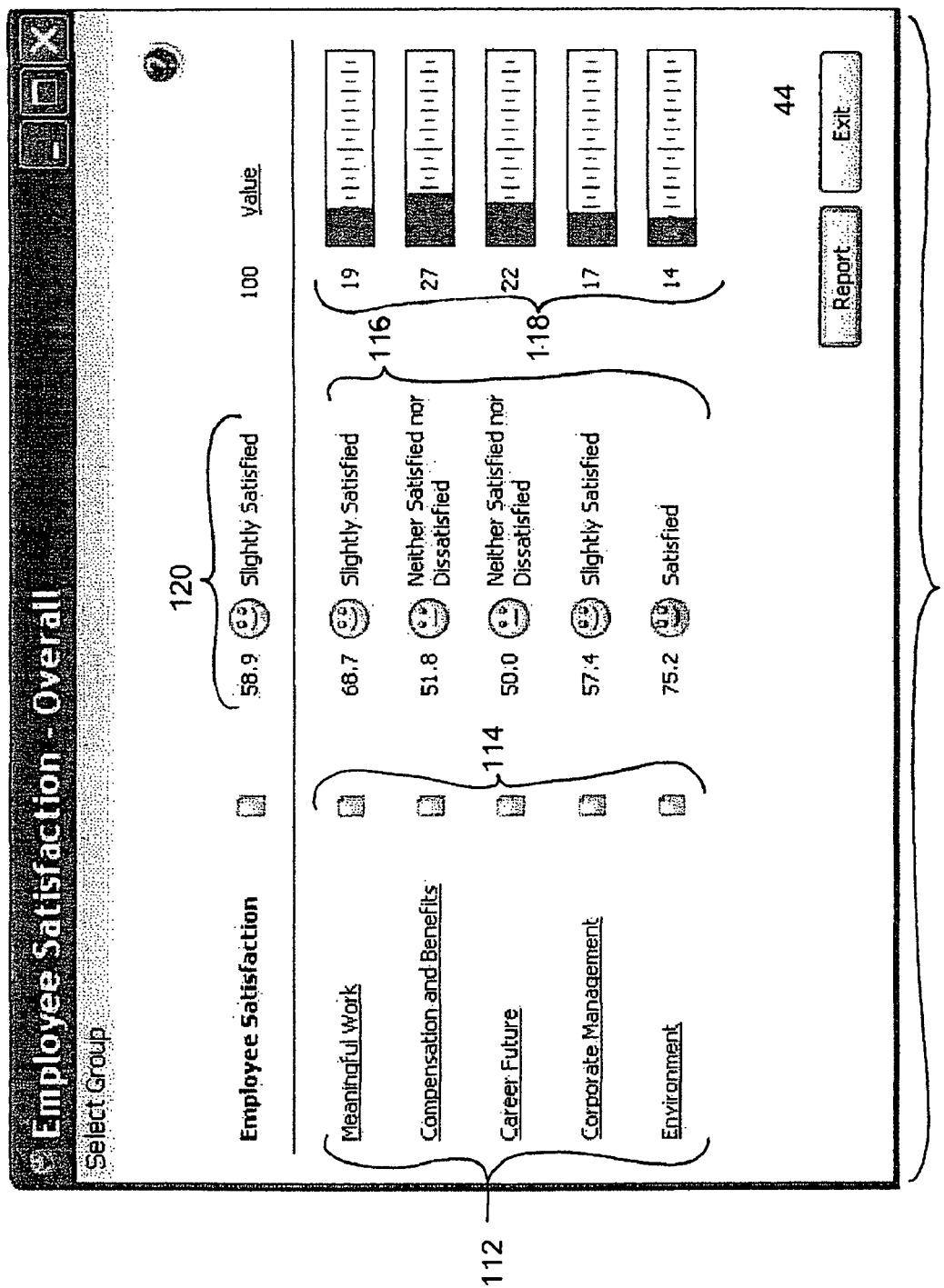
FIG. 8 illustrates a group report displaying weighted group results of the overall satisfaction of the entire group of participants who were administered a satisfaction metric that focused on employee satisfaction with their job and company.

Referring to FIG. 8, a published screen providing the overall employee satisfaction across the organization is presented generally at 110. The total satisfaction is shown numerically and pictorially at 120. The parent attributes are depicted in 112 while comments can be accessed at 114. Numeric and pictorial representations for satisfaction for each parent attribute 112 are shown at 116 whereas the overall value of each parent attribute is given numerically and graphically at 118. 44 is a link to exit the publication aspect of the matrix.

Preferably, the form of the reports is a word processing document or portable document format (PDF).

The satisfaction metrics of the present invention maintain a list of eligible participants. It can also track the number of surveys completed.

The medium by which the system operates varies. The preferred medium is a data-gathering interface. Exemplary data-gathering interfaces include, without limitation, internet Web servers, client-server wide area networks (WAN), local area networks (LAN), and touch-tone telephone systems. A Web-based server is accessed by an open Internet web server or a closed organizational Intranet web server. However, it is to be understood that the surveys can be administered in a variety of other mediums, for example, without limitation, stand-alone diskettes or compact discs that are individually distributed to the participant for loading onto a stand alone personal computer, a paper and pencil system that compiles the answers by scanning them automatically and other existing or to-be-developed administering means.

The preferred Web-based embodiment involves a plurality of files residing on a web server wherein the files, or pages, are accessible to the participants via a web browser, for example, NETSCAPE, INTERNET EXPLORER, MOZILLA, MOSAIC, or OPERA.

The pages of the Web-based embodiment are written in HTML (Hyper Text Markup Language) and prompt the participant with a plurality of survey questions. In one embodiment, the valuation calculations of the employee satisfaction system are incorporated into the pages of the survey. In another embodiment, the raw survey is downloaded onto an administrator accessible system, and any calculations are performed off-line.

In the preferred Web-based embodiment, an introductory page is accessible for anyone with the correct URL (Universal Resource Locator) address. Preferably, the URL is an easy-to-remember registered domain name. The URL can also be a numerically-based Internet protocol ("IP") address. Advantageously, the satisfaction metrics of the present invention can automatically transmit e-mails that contain a hypertext link to the metric to the entire participant list. For example, the hypertext link may direct the participant to an introductory page. The introductory page merely provides information about who is administering the survey and includes a hypertext link to begin the survey. In one embodiment, the link can be labeled "BEGIN SURVEY" and be shaded in a color to indicate that it is a link to another URL address.

However, access to the actual survey is restricted to those participants who are taking the survey. In one embodiment, upon clicking the link, the participant is prompted to provide a user id and password. In one embodiment, the user id and password may be identical for all participants. For example, an e-mail may be directed to every participant providing the user id and password along with an appropriate communication warning against giving out the password to non-employees or employee non-participants. In another embodiment, each participant may have a completely anonymous user id coupled with a password of the participant's choosing. In another embodiment, a metric identification number is automatically assigned when the participant initiates the metric. The participant can then provide the metric identification number to reenter the metric.

Once access is granted, the participant is first directed to an instructions page. The instructions page features a guide to filling out the survey. In addition, the instructions page should indicate the number of questions and the estimated time of completion. The instructions screen can optionally prompt the participant to indicate whether the instructions were read by clicking on a "YES" or "NO." Upon clicking on "YES" the survey begins.

The instruction page further displays the privacy policy of the survey.

This web-based embodiment further comprises a page per hierarchy. The general attribute is listed somewhere on the page to indicate the category. Preferably, the general attribute is listed at or near the top of the page. The specific attributes within its hierarchy are listed along with a place to assess satisfaction and value along with a comment section.

This embodiment further comprises a lock-out feature that prevents the participant from skipping general hierarchies or for incompletely answering. Until each specific attribute within a hierarchy is completely answered, the participant cannot access the next general attribute hierarchy. In other embodiments, the participant can view one or more hierarchies before performing the assessment.

After all of the specific attributes have been completely accessed the participant is sent to the next general attribute hierarchy. In one embodiment, the tool can be programmed to automatically send the user to the next hierarchy. In another embodiment, the user physically clicks a "NEXT" hypertext link to access the next attribute set. Advantageously, this allows the user to review his or her answers before proceeding.

The satisfaction metrics allow the participant to review his or her answers. In one embodiment, after the participant has entirely completed a survey, he or she is prompted to review all the answers for accuracy. In another embodiment, the participant is allowed to skip backwards to all answered survey questions. A hypertext link that allows the participant to go "back" is useful in this embodiment.

The satisfaction metrics of the present invention further comprise automated e-mailing abilities. A list of eligible participants is maintained within the tool. Automated e-mails are sent to convey information to the participants. For example, an e-mail is sent when the survey period begins. A reminder e-mail is sent periodically during the surveying life-cycle. An additional e-mail communication is sent when the reports are published.

Another feature of the satisfaction metrics is the administrator's capability to edit certain aspects of the tool. In one embodiment, the administrator has rights to create, modify, and/or delete assessment categories.

The satisfaction metrics of the present invention further comprise the capability to save and store raw and weighted employee assessment data and published reports. Advantageously, a storage mechanism allows the administrator to compare and contrast new employee assessments with past assessments to determine trends and abnormalities in employee satisfaction. The storage mechanism includes, without limitation, the server where the satisfaction metrics is stored or computer processor usable media such as floppy diskettes, CD-ROMS, and zip drives.

Another aspect of the present invention is directed to methods to implement the satisfaction metrics of the present invention.

A preferred embodiment of the implementation methods comprises assessing the participant's satisfaction, reviewing the results, and publishing the results.

The assessment step further comprises administering a survey to a plurality of participants, weighting the individual results, compiling a group response, and weighing the group response, all in accordance with the satisfaction metric.

In one embodiment, administering the survey comprises electronically communicating the survey questions to the employee. Preferably, the questions are lists of career attributes wherein the participant assesses his or her degree of satisfaction with an attribute and assigns a relative value of importance to that attribute. In other embodiments, the survey can be directed to open-ended, true/false and/or likert questions.

Weighing the results is directed to a mathematical computation that correlates the degree of satisfaction with an attribute with its importance. In one embodiment, the weighing step is directed to individual assessments. In another embodiment, the weighing step is directed to a compilation of assessments.

The method of the present invention also provides a means for the employee to provide written comments for each attribute.

The reviewing step of the present method is directed to reviewing the individual comments and redacting them to remove any obscene or foul language. An employee or a third party contractor who has been given the authority to administer the assessment tool owns editing rights to the comment means.

The publishing step comprises publishing a copy of a report that summarizes the assessments of the employees. Advantageously, the report can summarize many different predefined groups within the organization, for example, all department heads or all employees within a given department. Also, the report is optionally structured to only display certain attributes, for example, attributes having comments.

Preferably, the report is published electronically and access is given to all employees. In one embodiment, the electronic report is in a word processing document format. In another embodiment, the electronic report is in a portable document format. In yet another embodiment, the reports are published in a hard copy and are bound similar to a book.

The methods of the present invention further comprise automatically sending communications to the participants at the beginning and end of each major stage of the employee assessment. Preferably, an electronic communication is sent to the e-mail address of the employee. For example, e-mails are sent at the beginning of the survey period and at the end of the survey period. Preferably, an e-mail is sent at the middle of the survey period as a reminder to employees to take the survey.

Another aspect of the present invention pertains to metric management systems. In one embodiment, the satisfaction metric management systems include a server and one or more participant (or user) accessible devices that are in communication with the server. The server further includes a database capable of accessing and retrieving participant completed satisfaction metrics and a web interface. The server can be configured to upload and store satisfaction metrics in a database. In yet another embodiment, the satisfaction metrics are uploaded and stored in a mass storage device that is configured to read and write satisfaction metric data in a file store. The participant accessible device also includes a web interface for accessing the satisfaction metrics of the present invention. In one embodiment, the participant accessible device is a personal computer device like a desktop, a laptop, a portable palm device, and other similar devices.

In one embodiment, the server is in communication with the participant accessible device via a network. The network can include a LAN, a WAN, or other network configurations as known in the art. In the embodiment wherein the network is a LAN, access is via intranet and is limited to participant accessible devices within the organization. Firewalls may be used to employ encryption and data protection technologies. Other network communications include, without limitation, wireless technology, radio-based communications, telephone-based communications, or combinations of any of the foregoing.

In yet another embodiment, the satisfaction metric management system, in the form of program codes and algorithm operations, is loaded onto a central processing unit accessible to each participant. The program codes and algorithms can be embodied in the form of computer processor useable media, such as floppy diskettes, CD-ROMs, zip drives, non-volatile memory, or any other computer-readable storage medium, wherein the computer program code is loaded into and executed by the central processing unit. Optionally, the program codes and/or algorithm operations of the satisfaction metric system are programmed directly onto the CPU using any appropriate programming language such as C programming language.

After completing of the satisfaction metric, the participant can save each metric onto, for example, a computer readable storage media, which is then submitted to the metric administrator for compilation with the remainder of the metrics.

Based on the foregoing specification, the invention may be implemented using computer programming or engineering techniques including computer software, firmware, hardware or any combination or subset thereof. Any such resulting program, having computer-readable code means, may be embodied or provided within one or more computer-readable media, thereby making a computer program product, or an article of manufacture, according to the invention. The computer readable media may be, for instance, a fixed (hard) drive, diskette, optical disk, magnetic tape, programmable logic device, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

One skilled in the art of computer science will easily be able to combine the software created as described with appropriate general purpose or special purpose computer hardware, including programmable logic devices, to create a computer system or computer sub-system embodying the method of the invention. An apparatus for making, using or selling the invention may be one or more processing systems including, but not limited to, a central processing unit (CPU), memory, storage devices, communication links and devices, servers, I/O devices, or any sub-components of one or more processing systems, including software, firmware, hardware or any combination or subset thereof, which embody the invention. User input may be received from the keyboard, mouse, pen, voice, touch screen, or any other means by which a human can input data into a computer, including through other programs such as application programs.

As used herein, an "attribute" denotes some feature or description of an organization that is undergoing assessment utilizing a satisfaction metric in accordance with the present invention.

As used herein "icon" refers to a pictorial representation whose form suggests its meaning.

As used herein "left clicking' refers to tapping the left side button on the user interface mouse.

As used herein "right clicking" refers to tapping the right side button on the user interface mouse.

The terms "comprising", "consisting of", and "consisting essentially of" are defined according to their standard meaning and may be substituted for one another throughout the instant application in order to attach the specific meaning associated with each term.

As used in this specification and the appended claims, the singular forms "a", "an", and "the" include plural reference unless the context clearly dictates otherwise. Thus, for example, a reference to "a method" includes more than one such method, a reference to "an attribute" includes more than one such attribute, and the like.

Following is an example that illustrates procedures for practicing the invention. This example should not be construed as limiting.

EXAMPLE 1

An organization is preparing to survey its employees using a satisfaction metric of the present invention. The organization is planning to implement the survey system by following the steps listed in Table 1.

TABLE 1

| \multicolumn{2}{c}{Employee Satisfaction Assessment (ESA) Lifecycle} |  |
| --- | --- |
| State | Description |
| Create | ESA Administrators will create the data base for ESA. Select: Employee Satisfaction 20XX |
| Announce ESA | Employee Satisfaction Assessment email is sent to all employees. A 14-day time period that spans three weeks is used to give everyone a chance to complete it, even when they have scheduled vacation. |
| Assessment | Day 1: Employees are able to enter and modify their assessments. Select: Employee Satisfaction 20XX Day 7: ESA Reminder email is sent to all employees. Day 10: Individuals who have not completed the ESA are reminded within personal emails. |
| Review | Only the ESA Administrators can edit comments. Only profanity and personal attacks will be censored. If a comment focused on a specific individual is too brutally frank, it will addressed privately to that individual but not to the general public. |
| Publish | Everyone can review but not alter assessments and reports. ESA Is Published email is sent to all employees. |
| Summary Report | Management will prepare a summary report of the Employee Satisfaction Assessment. |
| Identify Key Concerns | Key concerns are identified and tagged. These concerns are precious as they capture opinions on all aspects of employee satisfaction. The tagged concerns are output to a word file with a 25 character Career Value label. |

TABLE 1-continued

Employee Satisfaction Assessment (ESA) Lifecycle

| State | Description |
| --- | --- |
| Company Perspective | The company perspective will be communicated to many of the concerns. Concerns that are misunderstandings or half-truths about company policy or procedures are easily addressed. |

The Employee Satisfaction Assessment e-mail is a communication sent to all participant employees that announces when the participants may fill out the survey and to whom questions should be directed.

An example of potential wording where "XX" refers to the last two digits of the year is as follows:
Subject: Employee Satisfaction Assessment
  The ESA is an online program to measure employee satisfaction and solicit employee comments that can be used to improve satisfaction.
  The Employee Satisfaction Team consists of John Doe and Jane Doe. We are administering and evaluating the Employee Satisfaction Assessment. If you have any questions, please contact either of the team members.
  All full-time regular and part-time regular employees are required to take the Employee Satisfaction Assessment. Employee types are defined in the New Employee Checklist.
  You may begin the Employee Satisfaction Assessment immediately. Please read the instructions which are presented at the beginning of the application. The ESA closes at 9:00AM on Thursday July 17 and will not be accessible after that time. The ESA should take about an hour to complete. To begin:
    Select: Employee Satisfaction 20XX On day seven of the assessment life cycle, a reminder e-mail is communicated to the participants. Preferable wording of the e-mail is:
Subject: ESA Reminder
  All full-time regular and part-time regular employees are required to take the Employee Satisfaction Assessment. Employee types are defined in the New Employee Checklist. As of 1:00PM Friday July 11$^{th}$, 20 employees still had not started the ESA. The ESA closes at 9:00AM on Thursday July 17$^{th}$ and will not be accessible after that time, so please begin soon while you still have time to complete it.
  Please read the instructions which are presented at the beginning of the application. To begin the ESA:
    Select: Employee Satisfaction 20XX When the results have been compiled and reviewed, a communication is sent to all participants allowing them to access the reports. It can be worded:
Subject: ESA Is Published
  The Employee Satisfaction Assessment is now in the Publish mode. To view the ESA results:
    Select: Employee Satisfaction 2OXX
  If your Employee Satisfaction is less than 25%, you need to consider whether you need to change your career.

All patents, patent applications, provisional applications, and publications referred to or cited herein are incorporated by reference in their entirety, including all figures and tables, to the extent they are not inconsistent with the explicit teachings of this specification.

It should be understood that the example and embodiments described herein are for illustrative purposes only and that various modifications or changes in light thereof will be suggested to persons skilled in the art and are to be included within the spirit and purview of this application.

I claim:

1. A non-transitory computer readable medium having instructions stored thereon that, when executed by a computer, cause the computer to perform a method of obtaining an evaluation of an organization, the method comprising:
  providing a first screen for receiving input of a respondent assessing a first attribute of an organization, the first screen comprising a first set of children attributes of the first attribute,
  wherein for each child attribute of the first attribute in the first set of children attributes, a first input field and a second input field are provided,
  wherein the first input field is configured to receive first data representing a degree of satisfaction with the child attribute of the first attribute and the second input field is configured to receive second data representing a raw value of importance of the child attribute of the first attribute;
  calculating a first satisfaction score for the first attribute using the first data and the second data of the first set of children attributes, wherein calculating the first satisfaction score for the first attribute using the first data and the second data of the first set of children attributes comprises:
    converting each second data to a relative value by dividing each second data by the sum of each of the second data;
    calculating an individual weighted satisfaction score for each first data of the first set of attributes by multiplying a numeric equivalent of the first data with the relative value of the second data of the child attribute to which the first data and the second data corresponds; and
    adding the individual weighted satisfaction scores together to obtain the first satisfaction score for the first attribute;
  providing a second screen for assessing a second attribute of which the first attribute is a hierarchical child, wherein the second screen comprises a second set of children attributes of the second attribute including the first attribute,
  wherein for each child attribute of the second attribute in the second set of attributes, a third input field is provided,
  wherein the third input field is configured to receive third data representing a raw value of importance of the child attribute of the second attribute,
  wherein the second screen displays a degree of satisfaction for each of the children attributes of the second attribute including the first attribute,
  wherein the degree of satisfaction displayed for the first attribute is the first satisfaction score calculated for the first attribute and the third input field provided for the first attribute is displayed related to other attributes in the second set of attributes and is distinct from the raw value of importance received via the second input field of the first screen; and calculating a second satisfaction score for the second attribute using the degree of satisfaction for each of the children attributes of the second attribute including the first satisfaction score for the first attribute and the third data of the second set of children attributes, wherein calculating the second satisfaction score for the second attribute using the degree of satisfaction for each of the children attributes of the second attribute including the first satisfaction score for the first attribute and the third data of the second set of children attributes comprises:

converting each third data to a relative value by dividing each third data by the sum of each of the third data;

calculating an individual weighted satisfaction score for each of the children attributes of the second attribute including calculating a weighted satisfaction score for the first attribute by multiplying the first satisfaction score with the relative value of the third data corresponding to the first attribute; and adding the individual weighted satisfaction scores together to obtain the second satisfaction score for the second attribute wherein the first screen is presented before the second screen such that a hierarchy of the parent attributes and the children attributes are presented for evaluation by the respondent from bottom to top.

2. The medium of claim 1, wherein the first screen further comprises a representation of a relation between the first attribute and its parent attribute.

3. The medium of claim 1, wherein the first data comprises a selected icon representing the degree of satisfaction.

4. The medium of claim 1, wherein the second data comprises a selected position on a bar graph representing the raw value of importance.

5. The medium of claim 1, wherein the first data comprises a selected phrase representing the degree of satisfaction.

6. The medium of claim 1, wherein the first data comprises a numeric value representing the degree of satisfaction.

7. The medium of claim 1, wherein the second data comprises a number on a scale representing the raw value of importance.

8. The medium of claim 1, wherein the method further comprises:

providing, in addition to the first screen for the first attribute, a corresponding screen for each of the children attributes of the second attribute for receiving input assessing each of the child attributes of the second attribute in the second set of attributes before providing the second screen.

9. The medium of claim 1, wherein the method further comprises:

providing a third screen for assessing a third attribute of which the second attribute is a hierarchical child, wherein the third screen comprises a third set of children attributes of the third attribute including the second attribute, wherein for each child attribute of the third attribute in the third set of attributes, a fourth input field is provided, wherein the fourth input field is configured to receive fourth data representing a raw value of importance of the child attribute of the third attribute, wherein the third screen displays a degree of satisfaction for each of the children attributes of the third attribute including the second attribute, wherein the degree of satisfaction displayed for the second attribute is the second satisfaction score calculated for the second attribute;

wherein the raw value of importance of the second attribute input via the fourth input field is an assessment of the second attribute in relation to an assessment of other attributes in the third set of children attributes and is distinct from the raw value of importance received regarding the second set of children attributes of the second attribute; and calculating a third satisfaction score for the third attribute using the degree of satisfaction for each of the children attributes of the third attribute including the second satisfaction score for the second attribute and the fourth data of the third set of children attributes.

10. A method of providing a survey for evaluating an organization according to predefined attributes, the predefined attributes being grouped according to a hierarchy in which a plurality of general attributes is grouped for evaluating a metric and at least one of the plurality of general attributes is a parent attribute to a subset of children attributes, wherein for at least one of the plurality of general attributes that is a parent attribute to a subset of children attributes, at least one of its children attributes is a parent to a subset of grandchildren attributes, the method comprising:

presenting the subset of grandchildren attributes together for valuation of the grandchildren attributes of the subset of grandchildren attributes in relation to each other, presenting the subset of children attributes together for valuation of the children attributes of the subset of children attributes in relation to each other and separate from any grandchildren attributes by:

providing a listing of the children attributes in the subset of children attributes separate from the grandchildren attributes; and providing an input field for each attribute in order to receive an assessment of the children attributes in the subset of children attributes distinct from any grandchildren of the children attributes; and presenting a group of general attributes for evaluating the metric together for valuation of the general attributes of the group in relation to each other and separate from any children attributes by:

providing a listing of the children attributes in the subset of children attributes separate from the grandchildren attributes; and providing an input field for each attribute in order to receive an assessment of the children attributes in the subset of children attributes distinct from any grandchildren of the children attributes, wherein the hierarchy of attributes including the general attributes, the parent attributes and the grandchildren attributes are presented to a respondent from bottom to top, the method comprising:

providing, for evaluation by a respondent, bottom-most attributes of the hierarchy in a first set grouped by parent attribute, wherein the first set is presented for evaluation with input fields for entering an assessment of both a degree of satisfaction and a raw value of importance for each attribute in the first set, wherein the degree of satisfaction and the raw value of importance for each attribute in the first set is used to calculate a satisfaction value for its parent attribute;

calculating the satisfaction value for each corresponding parent attribute to the bottom-most attributes by adding individual weighted satisfaction scores together, the individual weighted satisfaction scores being calculated by multiplying a numeric equivalent of the degree of satisfaction with a relative value of the raw value of importance calculated by dividing each raw value of importance by the sum of the raw values of importance;

after all bottom-most attributes of the hierarchy are provided for evaluation and each satisfaction value for all corresponding parent attributes to the bottom-most attributes is calculated, providing for evaluation by the respondent each parent attribute of the bottom-most attributes in a second set grouped by next level parent attribute, the next level parent attribute being a hierarchical parent attribute of the parent attributes of the bottom-most attributes of the hierarchy, wherein the second set is presented for evaluation with input fields for entering an assessment of a raw value of importance for each attribute in the second set, wherein the satisfaction value for the parent attribute of the first set and the raw value of importance for each attribute in the second set is used to calculate a next level satisfaction value for its next level parent attribute; and calculating the next level satisfaction value for each corresponding next level parent attribute by adding individual weighted satisfaction values for the parent attribute of the first set together, the individual weighted satisfaction values being calculated by multiplying the satisfaction value for the parent attribute of the first set with a relative value of the raw value of importance for each attribute in the second set calculated by dividing each raw value of importance by the sum of the raw values of importance.

* * * * *